United States Patent
Fujimaki

(10) Patent No.: US 9,208,436 B2
(45) Date of Patent: Dec. 8, 2015

(54) MODEL SELECTION DEVICE, MODEL SELECTION METHOD AND MODEL SELECTION PROGRAM

(75) Inventor: Ryohei Fujimaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 13/582,385

(22) PCT Filed: Mar. 3, 2011

(86) PCT No.: PCT/JP2011/054883
§ 371 (c)(1),
(2), (4) Date: Aug. 31, 2012

(87) PCT Pub. No.: WO2011/108632
PCT Pub. Date: Sep. 9, 2011

(65) Prior Publication Data
US 2012/0323834 A1   Dec. 20, 2012

(30) Foreign Application Priority Data
Mar. 3, 2010   (JP) .................................. 2010-046725

(51) Int. Cl.
*G06N 5/02* (2006.01)

(52) U.S. Cl.
CPC ........................ *G06N 5/02* (2013.01)

(58) Field of Classification Search
None
See application file for complete search history.

(56) References Cited

U.S. PATENT DOCUMENTS

2004/0254930 A1* 12/2004 Acharya .................. 707/6

FOREIGN PATENT DOCUMENTS

JP   2005-234214 A   9/2005
JP   2009-013503 A   1/2009

OTHER PUBLICATIONS

Corduneanu, Adrian, and Christopher M. Bishop. "Variational Bayesian model selection for mixture distributions." Artificial intelligence and Statistics. vol. 2001. Waltham, MA: Morgan Kaufmann, 2001.*
Verbeek, Jakob J., Nikos Vlassis, and B. Kröse. "Efficient greedy learning of Gaussian mixture models." Neural computation 15.2 (2003): 469-485.*
Law, Martin HC, Mario AT Figueiredo, and Anil K. Jain. "Simultaneous feature selection and clustering using mixture models." Pattern Analysis and Machine Intelligence, IEEE Transactions on 26.9 (2004): 1154-1166.*
Fujimaki, Ryohei, et al., "Linear Time Model Selection for Mixture of Heterogeneous Components via Expectation Minimization of Information Criteria," Technical Report on Information-Based Induction Sciences 2009, (IBIS2009), Oct. 19, 2009, pp. 312-319.
Tenmoto, Hiroshi, et al., "Optimal Selection of the Number of Components in Classifiers based on Mixture Models," IEICE Technical Report, Jun. 19, 1998, pp. 39-43, vol. 98, No. 127.

(Continued)

*Primary Examiner* — Kakali Chaki
*Assistant Examiner* — Kevin W Figueroa
(74) *Attorney, Agent, or Firm* — Sughrue Mion, PLLC

(57) ABSTRACT

The model selection device comprises a model optimization unit which optimizes a model for a mixed distribution, wherein related to an information criterion of complete data, with respect to a hidden variable post-event distribution of the complete data, the model optimization unit optimizes an expected information criterion of the complete data for a pair of a model and a parameter of a component which satisfies a predetermined condition.

12 Claims, 7 Drawing Sheets

(56) References Cited

OTHER PUBLICATIONS

Bishop, Christopher M., "Pattern Recognition and Machine Learning," New Edition, Springer-Verlag, Aug. 17, 2006, pp. 438-441.
Shimodaira, Hidetoshi, et al., "Model Selection, Frontier of Statiscal Science of Cross-Points of Prediction, Test and Presumption (3)", Iwanami Shoten, Publishers, Dec. 2004, pp. 24-25.
Wang, Yue, et al., "Probabilistic Principle Component Subspaces: A Hierarchical Finite Mixture Model for Data Visualization," IEEE Transactions of Neural Networks, May 2000, pp. 625-636, vol. 11, No. 3.
Yamanishi, Kenji, et al., "Introduction to MDL from Viewpoints of Information Theory," Japanese Society for Artificial Intelligence, NII Electronic Library Sevice, May 1992, pp. 427-434, vol. 7, No. 3.

\* cited by examiner

MODEL SELECTION DEVICE, MODEL SELECTION METHOD AND MODEL SELECTION PROGRAM

CROSS REFERENCE TO RELATED APPLICATIONS

This application is a National Stage of International Application No. PCT/JP2011/054883 filed on Mar. 3, 2011, which claims priority from Japanese Patent Application No. 2010-046725, filed on Mar. 3, 2010, the contents of all of which are incorporated herein by reference in their entirety.

TECHNICAL FIELD

The present invention relates to a data model selection device and, more particularly, a model selection device realizing high-speed model selection for a complicated mixed distribution model by optimizing an expectation value of a conditional information criterion, and a model selection method and a model selection program thereof.

BACKGROUND ART

Mixed distribution is a model representing data distribution by a plurality of distributions, which is an important model for industrial data modeling. Such model includes various kinds of models such as a mixed normal distribution and a mixed hidden Markov model.

In general, when the number of mixtures and a kind of each component are specified, it is possible to specify a parameter of a distribution by using a known technique such as an EM algorithm (e.g. Non-Patent Literature 1).

For estimating a parameter, it is necessary to determine the number of mixtures and a kind of each component and such a problem of specifying a form of a model is in general referred to as a "model selection problem" or "system Identification problem", a crucial problem for setting up a reliable model, for which a plurality of techniques are proposed as related art.

As a leading technique for model selection, proposed are model selection methods using an information criterion such as MDL (Minimum Description Length) (e.g. Non-Patent Literature 2) or AIC (Akaike's Information Criterion) (e.g. Non-Patent Literature 3).

Model selection method using an information criterion is a method of selecting a model which optimizes a value of an information criterion for data from among model candidates. Models which optimize a value of an information criterion are known to have superior statistical properties, for example, coincidence with a true distribution in a case of MDL and minimum prediction error in a case of AIC.

With a model selection method using an information criterion, calculating a value of an information criterion for each of all model candidates theoretically enables model selection for an arbitrary model candidate, while when the number of model candidates is large, calculation is practically impossible.

As an example, description will be made of the problem of selecting a mixed polynomial curve in the following. Polynomial curve has a plurality of degrees including a straight line (linear curve), a quadric curve and a cubic curve.

When selecting an optimum model by searching the number of mixtures from 1 to Cmax and the degree of a curve from 1 to Dmax, the related art requires calculation of an information criterion for each of all model candidates such as a straight line and two for a quadric curve (the number of mixtures is 3), three for a cubic curve and two for a quartic curve (the number of mixtures is 5). The number of model candidates, in a case where Cmax is 10 and Dmax is 10, for example, will be about a hundred thousand and in a case where Cmax is 20 and Dmax is 20, will be tens of billions, which will be exponentially increased as a model to be searched becomes complicated.

For this problem, Patent Literature 1 discloses a technique of executing high-speed model selection based on an information criterion by repeatedly optimizing an expected information criterion for complete data including a hidden variable with respect to various mixed distribution models.

Patent Literature 1: Japanese Patent Application No. 2009-013503.

Non-Patent Literature 1: Christopher M. Bishop, Pattern Recognition and Machine Learning, New Edition, Springer-Verlag, Aug. 17, 2006, pp. 438-441.

Non-Patent Literature 2: Kenji Yamanishi, Te Sun Han, "Introduction to MDL from Viewpoints of Information Theory", Japanese Society for Artificial Intelligence, May 1992, vol. 7, No. 3, pp. 427-434.

Non-Patent Literature 3: Hidetoshi Shimodaira et al., "Model Selection, Frontier of Statistical Science of Cross-Points of Prediction, Test and Presumption (3)", Iwanami Shoten, Publishers., December 2004, pp. 24-25.

Non-Patent Literature 4: Yue Wang, Lan Lou, Matthew T. Freedman, and Sun-Yuan Kung, "Probabilistic Principal Component Subspaces: A Hierarchical Finite Mixture Model for Data Visualization", IEEE TRANSACTIONS ON NEURAL NETWORKS, May 2000, Vol. 11, No. 2, pp. 625-636.

Since such a method of repeatedly optimizing an expected information criterion for complete data including a hidden variable as recited in the Patent Literature 1 is premised on that a parameter of each component of a mixed distribution is independent, it has a problem of inapplicability to a model failing to satisfy the premise.

Another problem is that high-speed model selection cannot be realized in such a condition where the number of component candidates is exponentially increased as a case where independency of an attribute should be selected in each component, for example. Condition where the number of component candidates is exponentially increased is, for example, a mixed distribution of normal distributions of D dimensions having different independencies. In this case, the number of component candidates will be drastically increased along with a dimension for a dimension independency candidate to exist as many as $\Sigma_{\{d=0\}}\{D^*(D-1)/2\}_{D^*(D-1)/2Cd}$.

OBJECT OF THE INVENTION

An object of the present invention is to solve the above-described problems and provide a model selection device realizing high-speed model selection even for a model in which components are dependent on each other, and a model selection method and a model selection program thereof.

Another object of the present invention is to provide a model selection device realizing high-speed model selection even when the number of component candidates is drastically increased for a parameter, and a model selection method and a model selection program thereof.

SUMMARY

A model selection device according to an exemplary aspect of the invention, comprises a model optimization unit which optimizes a model for a mixed distribution, wherein related to an information criterion of complete data, with respect to a hidden variable post-event distribution of the complete data, the model optimization unit optimizes an expected information criterion of the complete data for a pair of a model and a parameter of a component which satisfies a predetermined condition.

A model selection method according to an exemplary aspect of the invention, includes a model optimization step of optimizing a model for a mixed distribution, wherein at the model optimization step, related to an information criterion of complete data, with respect to a hidden variable post-event distribution of the complete data, an expected information criterion of the complete data for a pair of a model and a parameter of a component which satisfies a predetermined condition is optimized.

A model selection program according to an exemplary aspect of the invention, which causes a computer to execute a model optimization processing of optimizing a model for a mixed distribution, wherein in the model optimization processing, related to an information criterion of complete data, with respect to a hidden variable post-event distribution of the complete data, an expected information criterion of the complete data for a pair of a model and a parameter of a component which satisfies a predetermined condition is optimized.

The present invention enables high-speed model selection even for a model in which components are dependent on each other in estimation of a mixed distribution.

The present invention also enables high-speed model selection even when the number of component candidates is drastically increased for a parameter in estimation of a mixed distribution.

EXEMPLARY EMBODIMENT

Next, detailed description will be made of an exemplary embodiment of the present invention with reference to the drawings. In all the drawings, like components are identified by the same reference codes to appropriately omit description thereof.

First Exemplary Embodiment

First exemplary embodiment of the present invention will be detailed with reference to the drawings. In the following drawings, no description is made of a structure of a component not related to the gist of the present invention, whose illustration is omitted.

Figure 1:
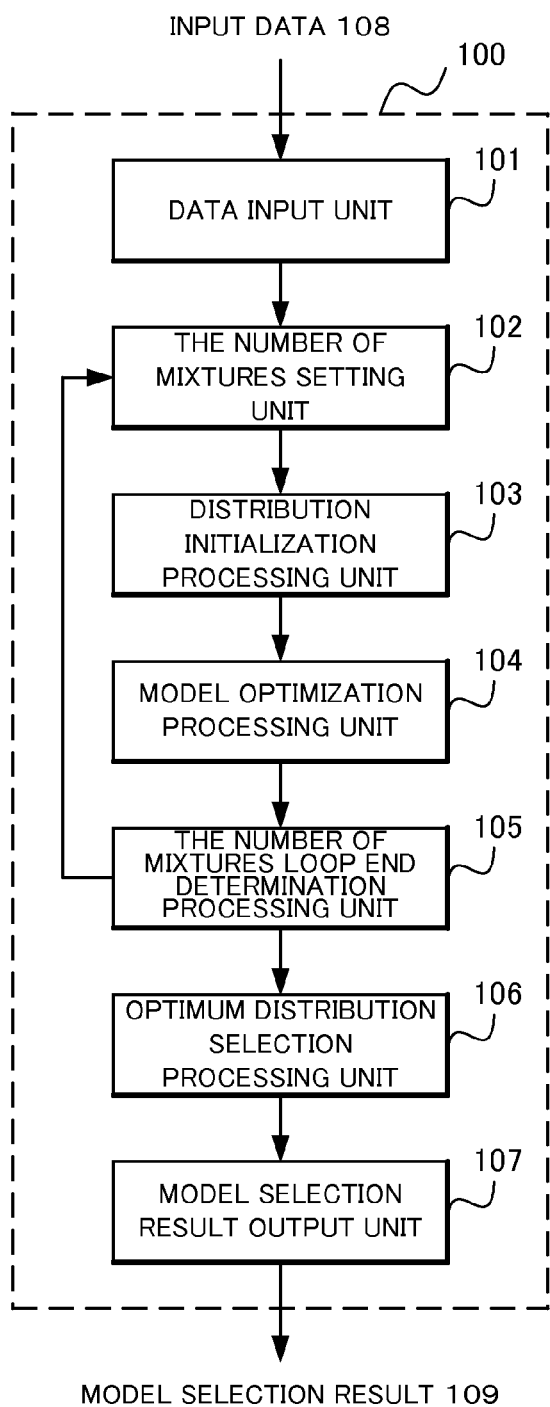
FIG. 1 is a block diagram showing a structure of a model selection device according to a first exemplary embodiment of the present invention.

FIG. 1 is a block diagram showing a structure of a model selection device 100 according to the first exemplary embodiment of the present invention. With reference to FIG. 1, the model selection device 100 of the present exemplary embodiment comprises a data input unit 101, a number of mixtures setting unit 102, a distribution initialization processing unit 103, a model optimization processing unit 104, a number of mixtures loop end determination processing unit 105, an optimum distribution selection processing unit 106 and a model selection result output unit 107.

Upon receiving input data 108, the model selection device 100 optimizes the number of mixtures, a kind, a parameter or the like of each component with respect to the input data 108 and outputs the result as a model selection result 109.

The data input unit 101 is a functional unit for receiving the input data 108. The input data 108 includes information necessary for model selection such as a kind and a parameter of each component to be mixed, and a candidate value of the number of mixtures.

The number of mixtures setting unit 102 has a function of selecting and setting the number of mixtures of a model from the input candidate values of the number of mixtures. The number of mixtures set by the number of mixtures setting unit 102 will be hereinafter referred to as K.

The distribution initialization processing unit 103 has a function of executing initialization processing for estimation. Initialization is executable by an arbitrary method. Possible is, for example, a method of setting a hidden variable value corresponding to data at random.

The model optimization processing unit 104 has a function of optimizing a model for a mixed distribution having the number of mixtures set by the number of mixtures setting unit 102. The model optimization processing unit 104 is specifically structured to be a model optimization processing unit 200 shown in FIG. 2 or a model optimization processing unit 300 shown in FIG. 3 whose details will be described later.

The number of mixtures loop end determination processing unit 105 has a function of determining whether an optimum information criterion value has been calculated for each of all the input candidate values of the number of mixtures.

The optimum distribution selection processing unit 106 has a function of comparing information criteria values calculated for all the candidate values of the number of mixtures to select the number of mixtures having an optimum information criterion. Value of an information criterion of an optimum model with respect to each number of mixtures is being calculated by the model optimization processing unit 104 as will be described later. For an optimum number of mixtures, a kind and a parameter of each component are optimized by the model optimization processing unit 104, which will be therefore selected as an optimum distribution.

The model selection result output unit 107 has a function of outputting an optimum number of mixtures, a kind and a parameter of a component, etc. as the model selection result 109.

Next, structures of the model optimization processing unit 200 and the model optimization processing unit 300 will be described which are shown as a specific structure example of the model optimization processing unit 104.

Figure 2:
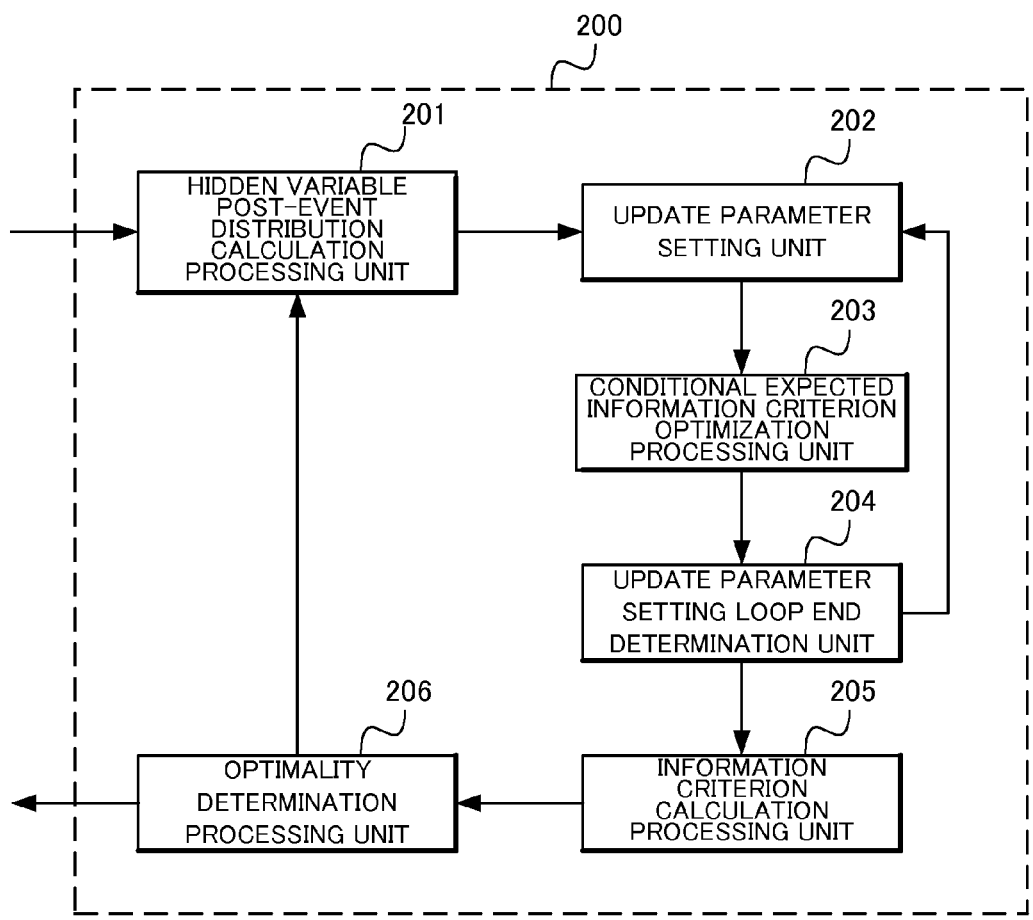
FIG. 2 is a diagram showing an example of a structure of a model optimization processing unit according to the present exemplary embodiment.

With reference to FIG. 2, the model optimization processing unit 200 comprises a hidden variable post-event distribution calculation processing unit 201, an update parameter setting unit 202, a conditional expected information criterion optimization processing unit 203, an update parameter setting loop end determination unit 204, an information criterion calculation processing unit 205 and an optimality determination processing unit 206.

The hidden variable post-event distribution calculation processing unit 201 has a function of calculating a post-event distribution related to a hidden variable indicating to which component of a mixed distribution each data input belongs.

The update parameter setting unit 202, which stores a rule for partially updating model and parameter candidates of each component, has a function of selecting an optimization target from the partial models and parameters.

The conditional expected information criterion optimization processing unit 203 has a function of optimizing, related to a post-event distribution calculated by the hidden variable post-event distribution calculation processing unit 201, an expected information criterion of complete data for a model and a parameter selected by the update parameter setting unit 202. Complete data here indicates a pair of input data and a hidden variable corresponding thereto. Input data will be referred to as incomplete data. As optimization, an arbitrary optimization method can be used.

The update parameter setting loop end determination unit 204 has a function of determining whether processing of conditional expected information criterion optimization processing is executed for each of all the pairs of models and parameters to be partially updated which are stored in the update parameter setting unit 202.

The information criterion calculation processing unit 205 has a function of calculating a value of an information criterion for incomplete data with respect to an updated model.

The optimality determination processing unit 206 has a function of comparing a value of an information criterion calculated in a main loop and a value of an information criterion calculated in a preceding loop to determine whether optimization processing converges.

The important aspect of the processing is setting partial model and parameter at the update parameter setting unit 202 to optimize a conditional expected information criterion, thereby preventing the number of candidates from being enormous even with respect to a complicated model candidate. As an example, consideration will be given to a mixture model formed of normal distributions of D dimensions whose independencies are different. In the expected information criterion optimization proposed in the Patent Literature 1, for example, for the optimization of each component, it is necessary to execute parameter estimation with respect to as many component candidates as $(\Sigma\_\{d=0\}^{D*}(D-1)/2\}_{D*(D-1)/2Cd})$ to select an optimum component. On the other hand, using the present invention enables optimization by parameter estimation related to $(D*(D-1)/2)$ by setting independencies of two dimensions as partial models and optimizing a conditional expected information criterion for the remaining dimensions, which realizes high-speed model selection.

Figure 3:
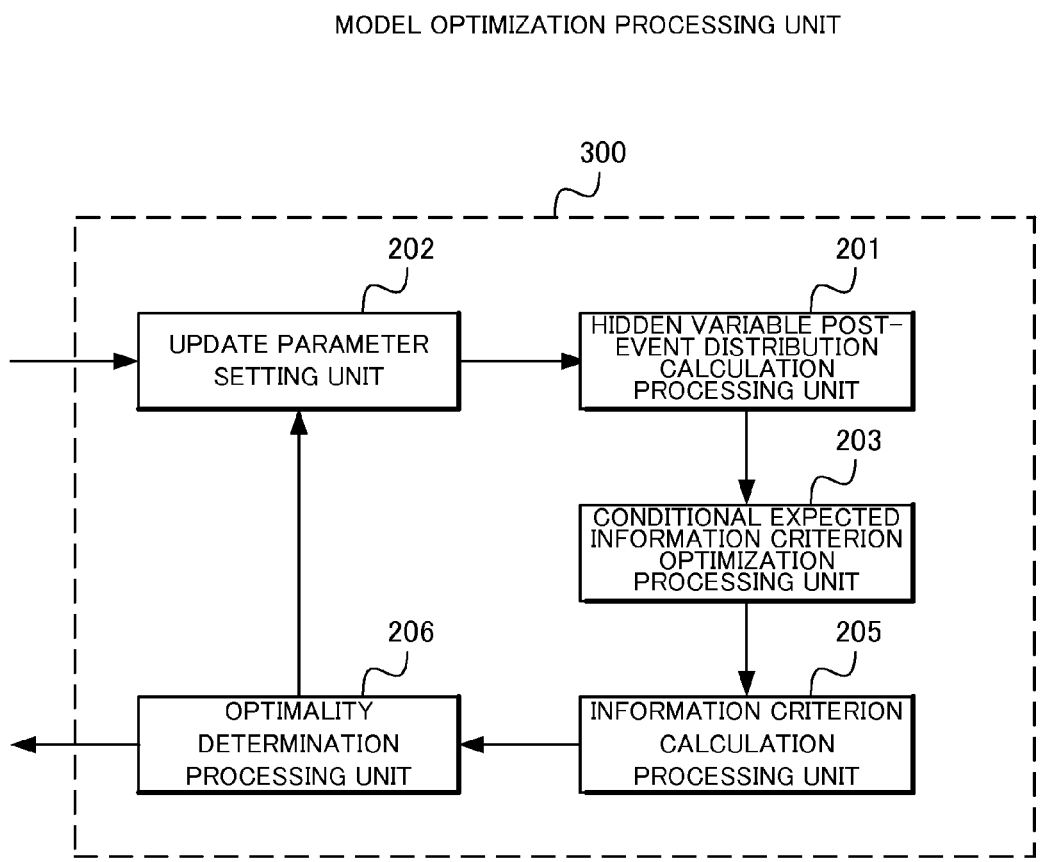
FIG. 3 is a diagram showing an example of a structure of the model optimization processing unit according to the present exemplary embodiment.

With reference to FIG. 3, the model optimization processing unit 300 differs from the model optimization processing unit 200 in the connection order of the hidden variable post-event distribution calculation processing unit 201 and the update parameter setting unit 202 and in failing to have the update parameter setting loop end determination unit 204. In this processing, irrespectively of whether update parameters are all updated or not by the update parameter setting unit, the processing ends upon determination of completion of optimization by the optimality determination processing unit 206.

Description of Operation of First Exemplary Embodiment

Next, operation of the present exemplary embodiment will be detailed with reference to the drawings.

Figure 4:
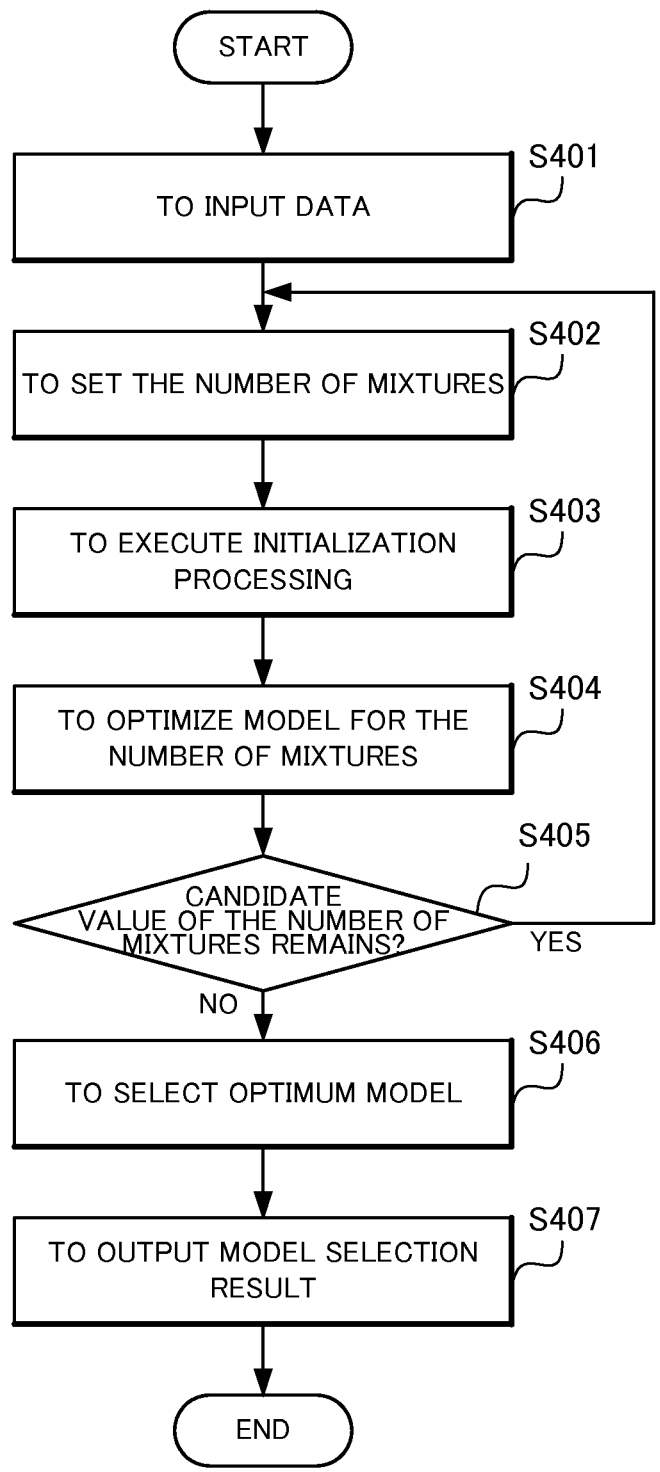
FIG. 4 is a flow chart for use in explaining contents of processing operation of the model selection device according to the present exemplary embodiment.

Operation of the model selection device 100 according to the present exemplary embodiment will be described in detail will reference to FIG. 4. FIG. 4 is a flow chart showing operation of processing of the model selection device 100 according to the present exemplary embodiment.

With reference to FIG. 4, an outline of operation of the model selection device 100 according to the present exemplary embodiment is as follows.

First, when the input data 108 is applied to the data input unit 101 (Step S401), the number of mixtures setting unit 102 selects and sets the number of mixtures yet to be optimized among the applied number of mixtures candidate values (Step S402).

Next, the distribution initialization processing unit 103 executes initialization necessary for optimization with respect to the designated number of mixtures (Step S403).

Next, the model optimization processing unit 104 estimates an optimum model for the designated number of mixtures (Step S404). Processing to be executed when the model optimization processing unit 200 and the model optimization processing unit 300 are used as the model optimization processing unit 104 will be described in detail later.

Next, the number of mixtures loop end determination processing unit 105 determines whether optimization is completed for all the number of mixtures candidate values and an information criterion value is calculated (Step S405).

When optimization is yet to be completed for each of all the candidates, repeat the processing from Step S401 to Step S404 ("NO" at Step S405).

When the optimization is completed for all the candidates, the optimum distribution selection processing unit 106 compares information criterion values optimized for the respective number of mixtures and selects the number of mixtures for which the value is optimum as an optimum model (Step S406). As to a selected model, a kind and a parameter of a component are optimized by the processing at Step S402 to Step 405 to obtain a distribution having optimum number of mixtures and kind of component.

Next, the model selection result output unit 107 outputs the model selection result 109 (Step S407).

Figure 5:
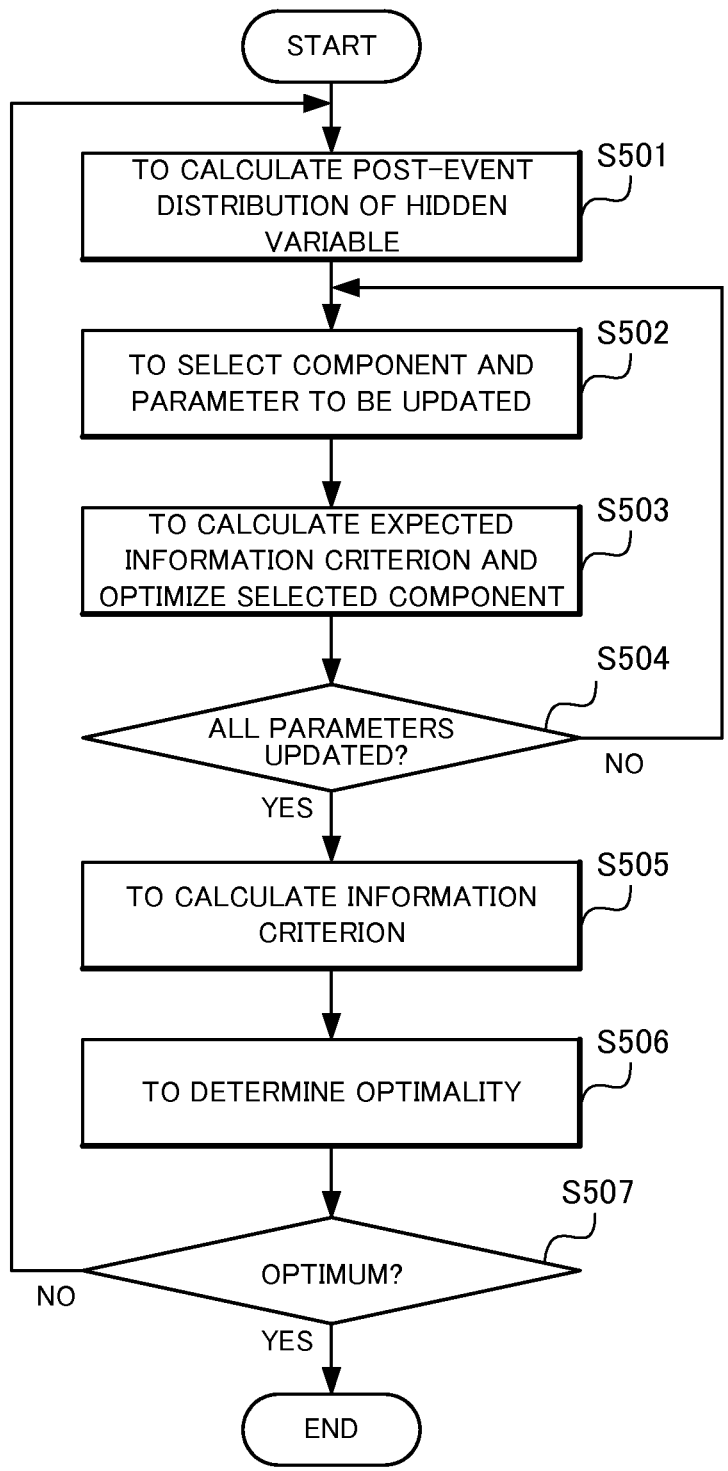
FIG. 5 is a flow chart for use in explaining contents of processing operation of the model optimization processing unit according to the present exemplary embodiment.

Next, processing to be executed when using the model optimization processing unit 200 as the model optimization processing unit 104 will be detailed with reference to FIG. 5. FIG. 5 is a flow chart showing operation of processing of the model optimization processing unit 200 according to the present exemplary embodiment.

With reference to FIG. 5, an outline of operation of the model optimization processing unit 200 according to the present exemplary embodiment is as follows.

First, receive output of the distribution initialization processing unit 103 to calculate a post-event distribution of a hidden variable at the hidden variable post-event distribution calculation processing unit 201 (Step S501).

Next, the update parameter setting unit 202 selects a pair of a model and a parameter independent of other model and parameter stored in the update parameter setting unit 202 (Step S502).

Next, the conditional expected information criterion optimization processing unit 203 estimates a model and a parameter which optimize a conditional expected information criterion related to the model and the parameter selected by the update parameter setting unit 202 (Step S503).

Next, the update parameter setting loop end determination unit 204 determines whether all the pairs of independent models and parameters stored in the update parameter setting unit 202 are updated or not (Step S504).

When there remains a pair yet to be updated, repeat the processing of Step S501 to Step S504 ("NO" at Step S504).

When there remains no pair yet to be updated ("YES" at Step S504), the information criterion calculation processing unit 205 calculates a value of an information criterion for the updated model (Step S505).

Next, the optimality determination processing unit 206 compares the value of an information criterion calculated in the present loop and the value of an information criterion calculated in a preceding loop to determine whether the optimization processing converges or not (Step S506). When the value of the information criterion converges ("YES" at Step S507), end the processing of the model optimization processing unit 200. When the value of the information criterion fails to converge ("NO" at Step S507), repeat the processing of Step S501 to Step S506.

Figure 6:
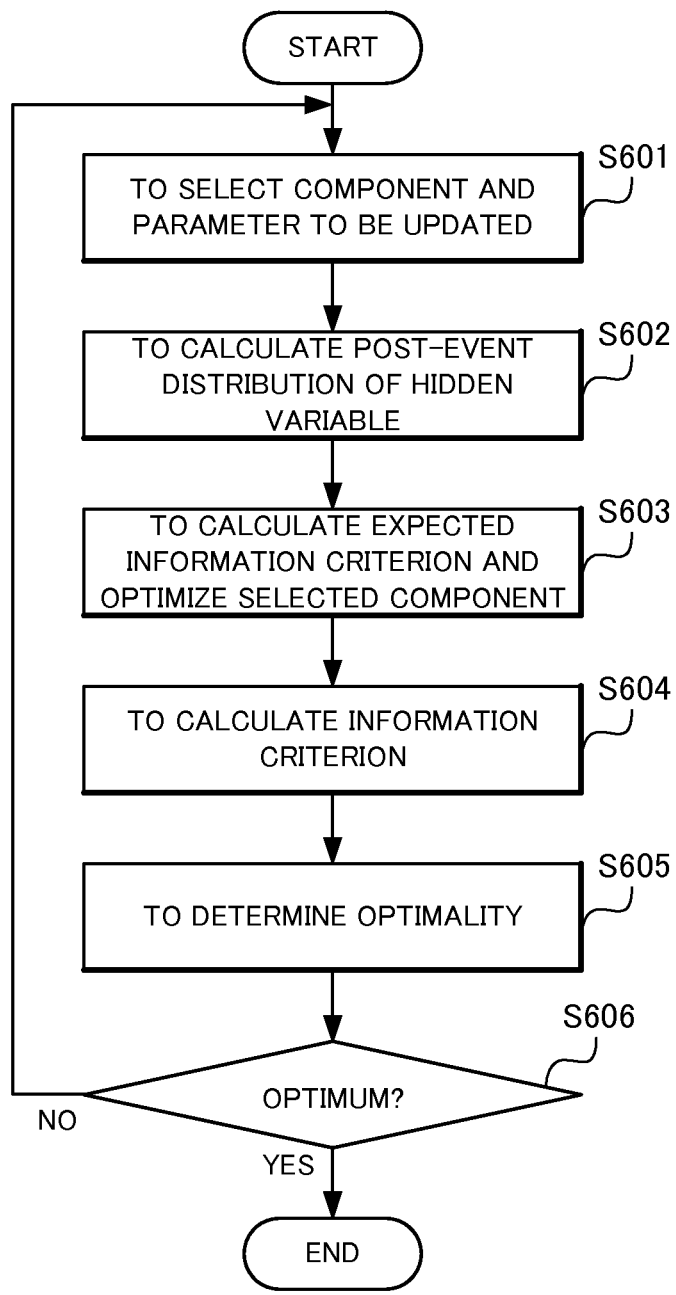
FIG. 6 is a flow chart for use in explaining contents of the processing operation of the model optimization processing unit according to the present exemplary embodiment.

Here, FIG. 6 is a flow chart showing operation of the model optimization processing unit 300 according to the present exemplary embodiment. The model optimization processing unit 300 according to the present exemplary embodiment differs from the operation of the model optimization processing unit 200 in that the order of processing of Steps S501 and Step S502 shown in FIG. 5 (Steps S601 and S602) is reversed and in including no processing of Step S504 shown in FIG. 5.

First Exemplary Embodiment

Next, one example will be described of a case where an MDL criterion is used as an information criterion.

First, a mixed distribution to be learned is expressed by the following Expression (1) with respect to a probability variable X corresponding to input data:

(NUMERICAL EXPRESSION 1)

$$P(X; \theta) = \sum_{k=1}^{K} \pi_k P(X; \eta_k) \tag{1}$$

where $\pi_k$ represents a mixture ratio related to a k-th component and $\eta_k$ represents a parameter of a distribution related to the k-th component, with $\theta=\{\pi, \eta_1, \ldots \eta_k\}$ and $\pi=(\pi_1, \ldots, \pi_k)$.

Distribution $P(X; \eta_k)$ of each component is a source of a set S of component candidates and as the Expression (1), a plurality of different distributions can be mixed such as a normal distribution and an exponential distribution. Although the Expression (1) is a framework for modeling a data distribution, the following structure similarly holds related to model selection with supervised data applied such as a regression distribution or a distribution for data classification.

Next, the MDL criterion is a criterion, which is expressed by an Expression (2), for selecting a model which minimizes a total sum of a data description length and a model description length as an optimum model. When using an MDL criterion as an information criterion, with an MDL criterion calculation method stored, the information criterion calculation processing unit 205 calculates an MDL criterion value of a distribution by the Expression (2):

(NUMERICAL EXPRESSION 2)

$$l(x^N;M)=l(x^N|M)+l(M) \tag{2}$$

wherein l represents a description length function, $x^N=(x_1, \ldots, x_N)$ represents an input data set and M represents a model. $x_i$ represents one point data and X represents a probability variable corresponding to the data. In a case of a distribution of X determined by a model M being $P(X; \theta)$ ($\theta$ being a parameter of the distribution), for example, $l(x^N|M)$ can be calculated as shown by the following Expressions (3) and (4):

(NUMERICAL EXPRESSION 3)

$$l(x^N | M) = \sum_{i=1}^{N} -\log P(x_i; \hat{\theta}) + \frac{K}{2}\log N \tag{3}$$

(NUMERICAL EXPRESSION 4)

$$l(x^N | M) = \sum_{i=1}^{N} -\ln P(x_i; \hat{\theta}) + \frac{K}{2}\ln\frac{K}{2\pi} + \ln\int_{\Theta}\sqrt{I(\theta)}\,d\theta \tag{4}$$

where log is assumed to be a logarithm whose base is 2 and ln is assumed to be a natural logarithm. ^ is assumed to represent that a parameter is a maximum likelihood estimation. $I(\theta)$ represents a Fisher information matrix. As the description length functions $l(x^N|M)$ and $l(M)$, various description methods are proposed according to a kind of M, and in the present invention, an arbitrary description method can be used.

Assume a hidden variable for data $x_i$ to be $z_i$ and $z^N$ to be $(z_i, \ldots z_N)$. With $z_i$ being $(z_{i1}, \ldots, z_{iK})$, $z_{ik}$ is a variable which assumes 1 when $x_i$ belongs to a k-th cluster, and assumes 0 when the same fails to belong to the k-th cluster. A pair of $x^N$ and $z^N$ is referred to as complete data.

The hidden variable post-event distribution calculation processing unit 201 has a method stored of calculating an expectation value related to a post-event probability of a hidden variable in a case of input of data $x^N$. Post-event probability varies with $P(X; \theta)$ and can be calculated by an arbitrary known method. In the following, Ez[A] is assumed to represent an expectation value related to a post-event probability of a hidden variable whose argument is A.

Description length in a case of complete data description is calculated by the following Expression (5):

(NUMERICAL EXPRESSION 5)

$$l(x^N,z^N;M)=l(x^N,z^N|M)+l(M) \tag{5}$$

where for $l(x^N, z^N;M)$, an arbitrary description length function can be used similarly to $l(x^N|M)$ and $l(M)$. As an example, the following Expression (6) can be used corresponding to the Expression (3):

(NUMERICAL EXPRESSION 6)

$$l(x^N, z^N | M) = \sum_{i=1}^{N}\sum_{k=1}^{K} z_{ik}(-\log P(x^N; \hat{\eta}_k) - \log P(z^N; \hat{\pi}_k)) + \sum_{k=1}^{K}\frac{M_k}{2}\log N_k + \frac{K-1}{2}\log N \tag{6}$$

where $M_k$ represents a dimension of $\eta_k$, and $N_k$ represents the number of pieces of data belonging to the k-th cluster and can be calculated by the following Expression (7). $P(z_i; \pi_k)$ represents a probability that cluster assignment related to i-th data will assume "1" or "0":

(NUMERICAL EXPRESSION 7)

$$N_k = \sum_{i=1}^{N} z_{ik} \quad (7)$$

Expected description length calculated by the conditional expected information criterion optimization processing unit 203 is a quantity of an expectation value taken related to a post-event probability of a hidden variable from $l(x^N, z^N—; M)$ with the model and the parameter selected by the update parameter setting unit 202 used as a variable and the other parameters fixed, which length is calculated as $Ez[l(x^N, z^N;M)]$. Since the model and the parameter set as an update parameter are independent of each other, a conditional expected description length related to the selected model and parameter can be optimized for each model and parameter. As a method of estimating a parameter of a distribution on a component basis, an arbitrary known technique can be used such as maximum likelihood estimation or the Method of Moments.

Next, a model to which the model selection device 100 proposed in the present invention is applicable will be specifically described in the following.

Second Exemplary Embodiment (Plurality of Mixed Distributions Having Different Independencies)

With the model selection device 100 proposed in the present invention used, the number of mixtures and independency of each component can be optimized at high speed with respect to a mixed distribution including a plurality of distributions having multidimensional data whose independencies are different from each other.

Determining whether arbitrary two dimensions of each component are independent of each other is stored as a model in the update parameter setting unit 202. This enables sequential selection of independences of two each of dimensions to realize high-speed learning even when the number of combinations among independencies is drastically increased with an increase in dimension.

Third Exemplary Embodiment (Joint Distribution Having Various Marginal Distributions of Different Kinds)

Use of the model selection device proposed by the present invention enables optimization of the number of mixtures and a kind of marginal distribution of each component with respect to a mixed distribution having a plurality of different marginal distributions.

Since when multidimensional data is applied, an optimum distribution varies with each dimension in general, in a case of a mixed distribution, its joint distribution should be considered, which causes a problem of finding which dimension corresponds to which distribution. Under these circumstances, setting to which model a marginal distribution of each dimension of each component corresponds by the update parameter setting unit 202 and updating an optimum distribution on a dimension basis enables high-speed model selection.

Use of the model selection device 100 proposed by the present invention enables not only estimation of a marginal distribution but also simultaneous estimation of a copula which represents a correlation between marginal distributions.

Fourth Exemplary Embodiment (Model and Attribute Selection of Mixed Identification Model Using Different Attributes)

Use of the model selection device 100 proposed by the present invention enables high-speed model selection with respect to model and attribute selection of a mixed identification model using different attributes.

In a case where, for example, with respect to a certain component, an attribute 1 has information valid for data identification and with respect to another component, an attribute 2 has information valid for identification, it will be important to estimate a valid attribute differing with each component, resulting in enormous number of combinations among attributes to be used and attributes not to be used. According to the technique according to the present invention, setting use/non-use of each attribute in each component to be a model and a parameter which should be set by the update parameter setting unit 202 enables high-speed estimation of an attribute valid for identification in each component.

Effects of the First Exemplary Embodiment

Next, effects of the present exemplary embodiment will be described.

The present exemplary embodiment realizes high-speed model selection in estimation of a mixed distribution even with respect to a model in which components are dependent on each other.

The present exemplary embodiment also realizes high-speed model selection in estimation of a mixed distribution even when the number of component candidates is drastically increased for a parameter.

Figure 7:
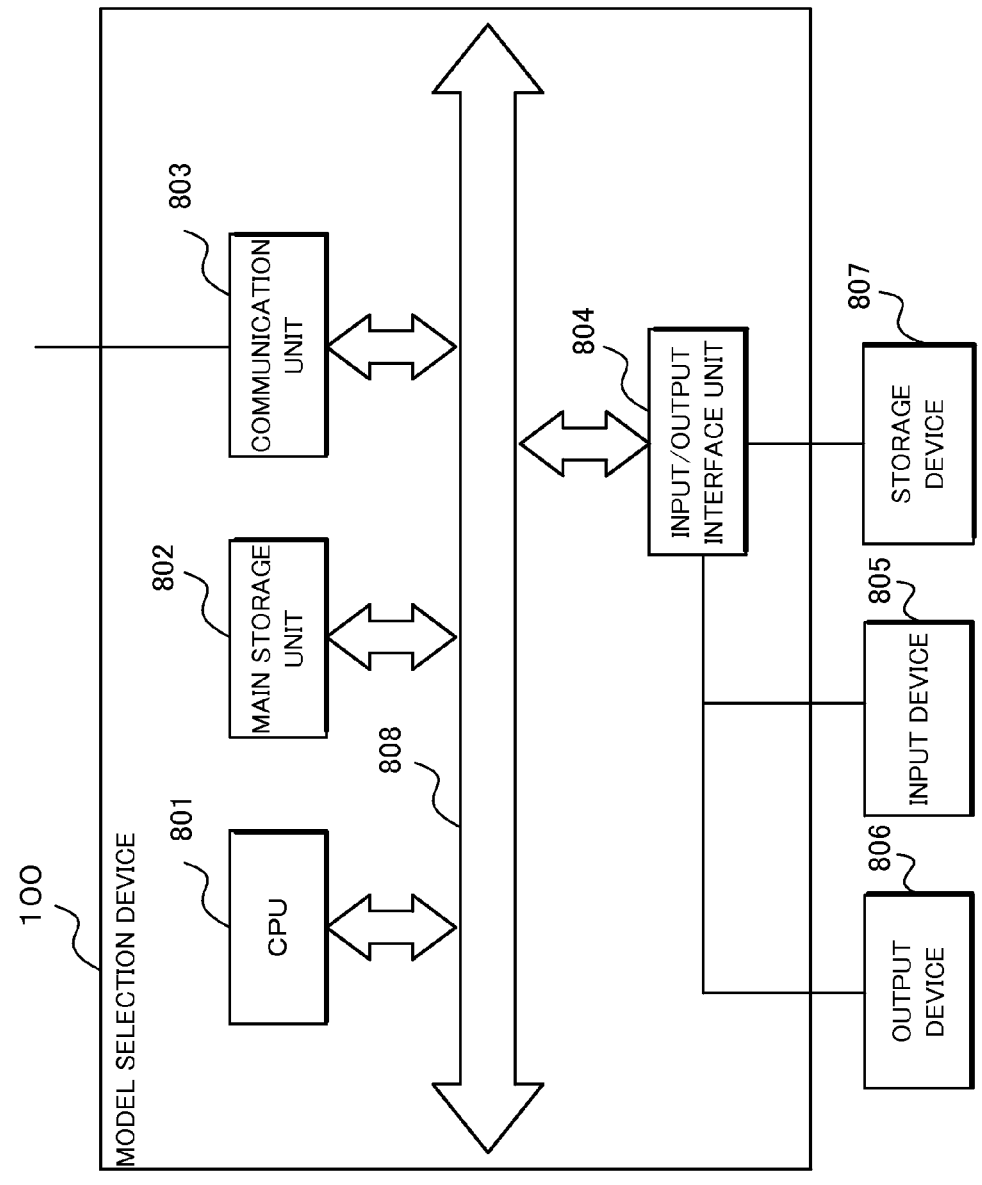
FIG. 7 is a block diagram showing an example of a hardware configuration of the model selection device of the present invention.

Next, an example of a hardware configuration of the model selection device 100 according to the present invention will be described with reference to FIG. 7. FIG. 7 is a block diagram showing an example of a hardware configuration of the model selection device 100.

With reference to FIG. 7, the model selection device 100, which has the same hardware configuration as that of a common computer device, comprises a CPU (Central Processing Unit) 801, a main storage unit 802 formed of a memory such as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects each of the above-described components with each other. The storage device 807 is realized by a hard disk device or the like which is formed of a non-volatile memory such as a ROM (Read Only Memory), a magnetic disk or a semiconductor memory.

The data input unit 101, the number of mixtures setting unit 102, the distribution initialization processing unit 103, the model optimization processing unit 104, the number of mixtures loop end determination processing unit 105, the optimum distribution selection processing unit 106 and the model selection result output unit 107 in the model selection device 100 of the present invention have their operation realized not only in hardware by being mounted with a circuit part as a hardware part such as an LSI (Large Scale Integration) with a program incorporated but also in software by storing a program which provides the functions in the storage device 807, loading the program into the main storage unit 802 and executing the same by the CPU 801.

While the present invention has been described with respect to the preferred exemplary embodiment in the foregoing, such is for illustrative purpose only and it is not to be construed limitative. Modification and variation of the present invention will be obvious within the scope of its technical idea.

Arbitrary combination of the foregoing components and conversion of the expressions of the present invention to/from a method, a device, a system, a recording medium, a computer program and the like are also available as a mode of the present invention.

In addition, the various components of the present invention need not always be independent of each other, and a plurality of components may be formed as one member, or one component may be formed by a plurality of members, or a certain component may be a part of other component, or a part of a certain component and a part of other component may overlap with each other, or the like.

While the method and the computer program of the present invention have a plurality of procedures recited in order, the order of the recitation is not a limitation to the order of execution of the plurality of procedures. When executing the method and the computer program of the present invention, therefore, the order of the plurality of procedures can be changed within a range not hindering the contents.

The plurality of procedures of the method and the computer program of the present invention are not limitedly executed at timing different from each other. Therefore, during the execution of a certain procedure, other procedure may occur, or a part or all of execution timing of a certain procedure and execution timing of other procedure may overlap with each other, or the like.

Although a part or all of the above-described exemplary embodiment can be recited as in the following claims, it is not limited thereto.

The whole or part of the exemplary embodiments disclosed above can be described as, but not limited to, the following supplementary notes.

(Supplementary note 1) A model selection device, comprising:

a model optimization unit which optimizes a model for a mixed distribution, wherein related to an information criterion of complete data, with respect to a hidden variable post-event distribution of said complete data, said model optimization unit optimizes an expected information criterion of said complete data for a pair of a model and a parameter of a component which satisfies a predetermined condition.

(Supplementary note 2) The model selection device according to supplementary note 1, comprising:

a number of mixtures setting unit which selects a candidate value yet to be optimized from among candidate values of the number of mixtures;

a distribution initialization unit which executes initialization processing of data by using the number of mixtures selected by said number of mixtures setting unit;

a number of mixtures loop end determination unit which determines whether a value of an optimum information criterion is calculated with respect to each of candidate values of all the numbers of mixtures and when determining that not all the values are calculated, causes another execution of the processing by said number of mixtures setting unit, said distribution initialization unit and said model optimization unit; and an optimum distribution selection unit which compares values of information criteria calculated with respect to candidate values of all the numbers of mixtures to select the number of mixtures whose information criterion is optimum, wherein said model optimization unit includes:

a hidden variable post-event distribution calculation unit which calculates a post-event distribution with respect to a hidden variable of said data;

an update parameter setting unit which selects a pair of a model and a parameter of a component which satisfies a predetermined condition;

a conditional expected information criterion optimization unit which, related to a post-event distribution calculated by said hidden variable post-event distribution calculation unit, optimizes an expected information criterion for complete data with respect to a pair of a model and a parameter selected by said update parameter setting unit;

an information criterion calculation unit which calculates a value of an information criterion for incomplete data with respect to a model updated by optimization by said conditional expected information criterion optimization unit; and an optimality determination unit which determines optimality of a value of an information criterion calculated by said information criterion calculation unit and when determining that the value is not optimum, executes the optimization processing again.

(Supplementary note 3) The model selection device according to supplementary note 2, wherein said model optimization unit includes:

an update parameter setting loop end determination unit which when there are a plurality of pairs of a model and a parameter of a component satisfying a predetermined condition, repeatedly causes execution of the processing by said update parameter setting unit and said conditional expected information criterion minimization optimization unit until optimization of an expected information criterion for complete data is executed with respect to all the pairs.

(Supplementary note 4) The model selection device according to any one of supplementary note 1 through supplementary note 3, wherein said information criterion is an MDL criterion.

(Supplementary note 5) The model selection device according to any one of supplementary note 1 through supplementary note 4, wherein said predetermined condition is independent of other model and parameter.

(Supplementary note 6) The model selection device according to any one of supplementary note 1 through supplementary note 4, wherein with respect to a mixed distribution of a plurality of distributions having multidimensional data whose independencies are different from each other, the number of mixtures and independency of each component are optimized.

(Supplementary note 7) The model selection device according to any one of supplementary note 1 through supplementary note 4, wherein with respect to a mixed distribution of a plurality of different marginal distributions, the number of mixtures and a kind of marginal distribution of each component are optimized.

(Supplementary note 8) The model selection device according to any one of supplementary note 1 through supplementary note 4, wherein related to selection of a model and an attribute of a mixed identification model using different attributes, an attribute valid for identification in each component is optimized.

(Supplementary note 9) A model selection method, comprising:

a model optimization step of optimizing a model for a mixed distribution, wherein at said model optimization step, related to an information criterion of complete data, with respect to a hidden variable post-event distribution of said complete data, an expected information criterion of said complete data for a pair of a model and a parameter of a component which satisfies a predetermined condition is optimized.

(Supplementary note 10) The model selection method according to supplementary note 9, comprising:

a number of mixtures setting step of selecting a candidate value yet to be optimized from among candidate values of the number of mixtures, a distribution initialization step of executing initialization processing of data by using the number of mixtures selected at said number of mixtures setting step, a number of mixtures loop end determination step of determining whether a value of an optimum information criterion is calculated with respect to each of candidate values of all the numbers of mixtures and when determining that not all the values are calculated, causing another execution of the processing by said number of mixtures setting step, said distribution initialization step and said model optimization step, and a optimum distribution selection step of comparing values of information criteria calculated with respect to candidate values of all the numbers of mixtures to select the number of mixtures whose information criterion is optimum, wherein said model optimization step includes:

a hidden variable post-event distribution calculation step of calculating a post-event distribution with respect to a hidden variable of said data, an update parameter setting step of selecting a pair of a model and a parameter of a component which satisfies a predetermined condition, a conditional expected information criterion optimization step of, related to a post-event distribution calculated at said hidden variable post-event distribution calculation step, optimizing an expected information criterion for complete data with respect to the pair of a model and a parameter selected at said update parameter setting step, an information criterion calculation step of calculating a value of an information criterion for incomplete data with respect to the model updated by optimization at said conditional expected information criterion optimization step, and an optimality determination step of determining optimality of a value of an information criterion calculated by said information criterion calculation step and when determining that the value is not optimum, executing the optimization processing again.

(Supplementary note 11) The model selection method according to supplementary note 10, wherein said model optimization step includes an update parameter setting loop end determination step of, when there are a plurality of pairs of a model and a parameter of a component satisfying a predetermined condition, repeatedly causing execution of the processing by said update parameter setting step and said conditional expected information criterion optimization step until optimization of an expected information criterion for complete data is executed with respect to all the pairs.

(Supplementary note 12) The model selection method according to any one of supplementary note 9 through supplementary note 11, wherein said information criterion is an MDL criterion.

(Supplementary note 13) The model selection method according to any one of supplementary note 9 through supplementary note 12, wherein said predetermined condition is independent of other model and parameter.

(Supplementary note 14) The model selection method according to any one of supplementary note 9 through supplementary note 12, wherein with respect to a mixed distribution of a plurality of distributions having multidimensional data whose independencies are different from each other, the number of mixtures and independency of each component are optimized.

(Supplementary note 15) The model selection method according to any one of supplementary note 9 through supplementary note 12, wherein with respect to a mixed distribution of a plurality of different marginal distributions, the number of mixtures and a kind of marginal distribution of each component are optimized.

(Supplementary note 16) The model selection method according to any one of supplementary note 9 through supplementary note 12, wherein related to selection of a model and an attribute of a mixed identification model using different attributes, an attribute valid for identification in each component is optimized.

(Supplementary note 17) A model selection program which causes a computer to execute a model optimization processing of optimizing a model for a mixed distribution, wherein in said model optimization processing, related to an information criterion of complete data, with respect to a hidden variable post-event distribution of said complete data, an expected information criterion of said complete data for a pair of a model and a parameter of a component which satisfies a predetermined condition is optimized.

(Supplementary note 18) The model selection program according to supplementary note 17, which causes a computer to execute:

a number of mixtures setting processing of selecting a candidate value yet to be optimized from among candidate values of the number of mixtures, a distribution initialization processing of executing initialization processing of data by using the number of mixtures selected by said number of mixtures setting processing, a number of mixtures loop end determination processing of determining whether a value of an optimum information criterion is calculated with respect to each of candidate values of all the numbers of mixtures and when determining that not all the values are calculated, causing another execution of the processing by said number of mixtures setting processing, said distribution initialization processing and said model optimization processing, and an optimum distribution selection processing of comparing values of information criteria calculated with respect to candidate values of all the numbers of mixtures to select the number of mixtures whose information criterion is optimum, wherein said model optimization processing includes:

a hidden variable post-event distribution calculation processing of calculating a post-event distribution with respect to a hidden variable of said data, an update parameter setting processing of selecting a pair of a model and a parameter of a component which satisfies a predetermined condition, a conditional expected information criterion optimization processing of, related to a post-event distribution calculated by said hidden variable post-event distribution calculation processing, optimizing an expected information criterion for complete data with respect to a pair of a model and a parameter selected by said update parameter setting processing, an information criterion calculation processing of calculating a value of an information criterion for incomplete data with respect to the model updated by optimization by said conditional expected information criterion optimization processing, and an optimality determination processing of determining optimality of a value of an information criterion calculated by said information criterion calculation processing and when determining that the value is not optimum, executing the optimization processing again.

INCORPORATION BY REFERENCE

This application is based upon and claims the benefit of priority from Japanese patent application No. 2010-046725, filed on Mar. 3, 2010, the disclosure of which is incorporated herein in its entirety by reference.

What is claimed is:

1. A model selection computer, comprising:
a model optimization unit which optimizes a model for a mixed distribution; and
an optimum distribution selection unit which selects a number of mixtures whose information criterion is optimum, wherein:
the model optimization unit optimizes an expected information criterion of the complete data by setting a partial model and parameter, and
related to an information criterion of complete data, said model optimization unit optimizes the expected information criterion of said complete data for a pair of a model and a parameter of a component which satisfies a predetermined condition by using an expected value of a hidden variable post-event distribution of said complete data,
wherein the model selection computer further comprises:
a number of mixtures setting unit which selects a candidate value yet to be optimized from among candidate values of the number of mixtures;
a distribution initialization unit which executes initialization processing of data by using the number of mixtures selected by said number of mixtures setting unit; and
a number of mixtures loop end determination unit which determines whether a value of an optimum information criterion is calculated with respect to each of candidate values of all the numbers of mixtures and when determining that not all the values are calculated, causes another execution of the processing by said number of mixtures setting unit, said distribution initialization unit and said model optimization unit;
wherein:
said model optimization unit includes:
a hidden variable post-event distribution calculation unit which calculates a post-event distribution with respect to a hidden variable of said data;
an update parameter setting unit which selects a pair of a model and a parameter of a component which satisfies a predetermined condition;
a conditional expected information criterion optimization unit which, related to a post-event distribution calculated by said hidden variable post-event distribution calculation unit, optimizes an expected information criterion for complete data with respect to a pair of a model and a parameter selected by said update parameter setting unit;
an information criterion calculation unit which calculates a value of an information criterion for incomplete data with respect to a model updated by optimization by said conditional expected information criterion optimization unit; and
an optimality determination unit which determines optimality of a value of an information criterion calculated by said information criterion calculation unit and when determining that the value is not optimum, executes the optimization processing again, and
the optimum distribution selection unit selects a type of mixed components whose information criterion is optimum, and compares values of information criteria calculated with respect to candidate values of all the numbers of mixtures to select both the number of mixtures and the kind of mixtures whose information criterion is optimum.

2. The model selection computer according to claim 1, wherein said model optimization unit includes:
an update parameter setting loop end determination unit which when there are a plurality of pairs of a model and a parameter of a component satisfying a predetermined condition, repeatedly causes execution of the processing by said update parameter setting unit and said conditional expected information criterion minimization optimization unit until optimization of an expected information criterion for complete data is executed with respect to all the pairs.

3. The model selection computer according to claim 1, wherein said information criterion is an MDL criterion.

4. The model selection computer according to claim 1, wherein said predetermined condition is independent of other model and parameter.

5. The model selection computer according to claim 1, wherein with respect to a mixed distribution of a plurality of distributions having multidimensional data whose independencies are different from each other, the number of mixtures and independency of each component are optimized.

6. The model selection computer according to any one of claim 1 through claim 4, wherein with respect to a mixed distribution of a plurality of different marginal distributions, the number of mixtures and a kind of marginal distribution of each component are optimized.

7. The model selection computer according to claim 1, wherein related to selection of a model and an attribute of a mixed identification model using different attributes, an attribute valid for identification in each component is optimized.

8. The model selection computer according to claim 1, wherein:
the optimum distribution selection unit selects a kind of mixtures whose information criterion is optimum.

9. The model selection computer according to claim 1, wherein the optimum distribution selection unit selects the type of mixed components whose information criterion is optimum on the basis of expected information criterion of the complete data.

10. A model selection method comprising:
a model optimization step of optimizing a model for a mixed distribution and an expected information criterion of the complete data by setting partial model and parameter; and
an optimum distribution selection step of selecting a number of mixtures whose information criterion is optimum, wherein at said model optimization step,
related to an information criterion of complete data, the expected information criterion of said complete data for a pair of a model and a parameter of a component which satisfies a predetermined condition is optimized by using an expected value of a hidden variable post-event distribution of said complete data;
wherein the model selection method further comprises:
a number of mixtures setting step of selecting a candidate value yet to be optimized from among candidate values of the number of mixtures;
a distribution initialization step of executing initialization processing of data by using the number of mixtures selected in said number of mixtures setting step; and
a number of mixtures loop end determination step of determining whether a value of an optimum information criterion is calculated with respect to each of candidate values of all the numbers of mixtures and when determining that not all the values are calculated, causes another execution of the processing;
wherein:
said model optimization step includes:
 a hidden variable post-event distribution calculation step of calculating a post-event distribution with respect to a hidden variable of said data;
 an update parameter setting step of selecting a pair of a model and a parameter of a component which satisfies a predetermined condition;
 a conditional expected information criterion optimization step of optimizing, related to a post-event distribution calculated by said hidden variable post-event distribution calculation step, an expected information criterion for complete data with respect to a pair of a model and a parameter selected in said update parameter setting step;
 an information criterion calculation step of calculating a value of an information criterion for incomplete data with respect to a model updated by optimization in said conditional expected information criterion optimization step; and
 an optimality determination step of determining optimality of a value of an information criterion calculated in said information criterion calculation step and when determining that the value is not optimum, executing the optimization processing step again, and
the optimum distribution selection step includes selecting a type of mixed components whose information criterion is optimum, and comparing values of information criteria calculated with respect to candidate values of all the numbers of mixtures to select both the number of mixtures and the kind of mixtures whose information criterion is optimum.

11. A non-transitory computer-readable storage medium storing a model selection program, said model selection program causing a computer to execute:
a model optimization processing of optimizing a model for a mixed distribution, and an expected information criterion of the complete data by setting partial model and parameter; and
an optimum distribution selection processing of selecting a number of mixtures whose information criterion is optimum,
wherein in said model optimization processing,
related to an information criterion of complete data, the expected information criterion of said complete data for a pair of a model and a parameter of a component which satisfies a predetermined condition is optimized by using an expected value of a hidden variable post-event distribution of said complete data;
wherein the model selection program further causes the computer to execute:

a number of mixtures setting processing of selecting a candidate value yet to be optimized from among candidate values of the number of mixtures;
a distribution initialization processing of executing initialization processing of data by using the number of mixtures selected in said number of mixtures setting processing; and
a number of mixtures loop end determination processing of determining whether a value of an optimum information criterion is calculated with respect to each of candidate values of all the numbers of mixtures and when determining that not all the values are calculated, causes another execution of the processing;
wherein:
said model optimization processing includes:
 a hidden variable post-event distribution calculation processing of calculating a post-event distribution with respect to a hidden variable of said data;
 an update parameter setting processing of selecting a pair of a model and a parameter of a component which satisfies a predetermined condition;
 a conditional expected information criterion optimization processing of optimizing, related to a post-event distribution calculated by said hidden variable post-event distribution calculation processing, an expected information criterion for complete data with respect to a pair of a model and a parameter selected in said update parameter setting processing;
 an information criterion calculation processing of calculating a value of an information criterion for incomplete data with respect to a model updated by optimization in said conditional expected information criterion optimization processing; and
 an optimality determination processing of determining optimality of a value of an information criterion calculated in said information criterion calculation processing and when determining that the value is not optimum, executing the optimization processing again, and
the optimum distribution selection processing includes selecting a type of mixed components whose information criterion is optimum, and comparing values of information criteria calculated with respect to candidate values of all the numbers of mixtures to select both the number of mixtures and the kind of mixtures whose information criterion is optimum.

12. The model selection computer according to claim 8, wherein the information criterion of complete data is calculated using the Formula (1), $$l(x^N, z^N \mid M) = \sum_{i=1}^{N} \sum_{k=1}^{K} z_{ik}\left(-\log P(x^N; \hat{\eta}_k) - \log P(z^N; \hat{\pi}_k)\right) + \sum_{k=1}^{K} \frac{M_k}{2} \log N_k + \frac{K-1}{2} \log N \quad (1)$$

where l represents a description length function,
$x^n = (x_l, \ldots x_N)$ represents an input data set,
$z_i$ represents a hidden variable for data $x_i$; and $z^N$ to be $(z_i, \ldots z_N)$,
with $z_i$ being $(z_{il}, \ldots, z_{iK})$, $z_{ik}$ represents a variable which assumes 1 when $x_i$, belongs to a k-th cluster, and assumes 0 when the same fails to belong to the k-th cluster, M represents a model,
log is assumed to be a logarithm whose base is 2,
$P(X; \eta_k)$ represents distribution of each component,
$\eta_k$ represents a parameter of a distribution related to the k-th component,
$\hat{}$ is assumed to represent that a parameter is a maximum likelihood estimation,
$P(z_i; \pi_k)$ represents a probability that cluster assignment related to i-th data will assume "1" or "0";
$\pi_k$ represents a mixture ratio related to a k-th component,
$M_k$ represents a dimension of $\eta_k$,
$N_k$ represents the number of pieces of data belonging to the k-th cluster and can be calculated by the following formula (2), $$N_k = \sum_{i=1}^{N} z_{ik}. \tag{2}$$

* * * * *